United States Patent [19]
Honjo

[11] Patent Number: 5,319,468
[45] Date of Patent: Jun. 7, 1994

[54] IMAGE SIGNAL RECORDING AND REPRODUCING SYSTEM WITH USE OF BANDWIDTH COMPRESSION CODING

[75] Inventor: Masahiro Honjo, Osaka, Japan

[73] Assignee: Matsushita Electric Industrial Co., Ltd., Kadoma, Japan

[21] Appl. No.: 870,249

[22] Filed: Apr. 17, 1992

[30] Foreign Application Priority Data

Apr. 18, 1991 [JP] Japan ................................. 3-086956

[51] Int. Cl.⁵ .............................................. H04N 1/41
[52] U.S. Cl. .................................... 358/426; 348/415
[58] Field of Search ............... 358/426, 427, 310, 325, 358/327, 105, 133, 135, 136; H04N 1/41, 7/12

[56] References Cited

U.S. PATENT DOCUMENTS

| | | | |
|---|---|---|---|
| 4,694,329 | 9/1987 | Belmares-Sarabia et al. | 358/54 |
| 4,837,618 | 6/1989 | Hatori et al. | 358/135 |
| 5,049,991 | 9/1991 | Niihara | 358/135 |
| 5,194,961 | 3/1993 | Nagai | 358/310 |
| 5,223,949 | 6/1993 | Honjo | 358/426 |

*Primary Examiner*—Edward L. Coles, Sr.
*Assistant Examiner*—Kim Yen Vu
*Attorney, Agent, or Firm*—Willian Brinks Hofer Gilson & Lione

[57] ABSTRACT

A recording and reproducing system for digitizing the image signal and compression coding the signal by in-field and inter-field, or in-frame and inter-frame coding, wherein the inter-field or inter-frame coding is used as the primary coding method, in field or in-frame coding is applied at a regular interval, and when scene changes are detected, in-field or in-frame coding is mandatorily applied to the field or frame immediately after the scene change. Furthermore, a new in-field or in-frame coding cycle is started at the field or frame immediately after the scene change to absorb the increased information resulting from in-field or in-frame coding by increasing the compression ratio of the inter-field or inter-frame coding means within the period to the next in-field or in-frame coded field or frame. The generation of additional information is further reduced and the increase in information produced by the field or frame immediately after the scene change is absorbed by a data substitution, specifically by absorbing the increase in information generated by the field or frame immediately after the scene change by using the same data as that of the immediately preceding field or frame for the field or frame immediately before or after the scene change.

5 Claims, 2 Drawing Sheets

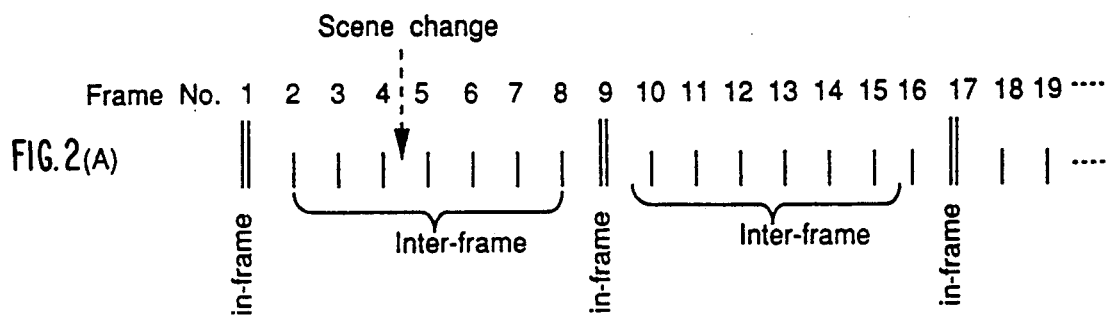
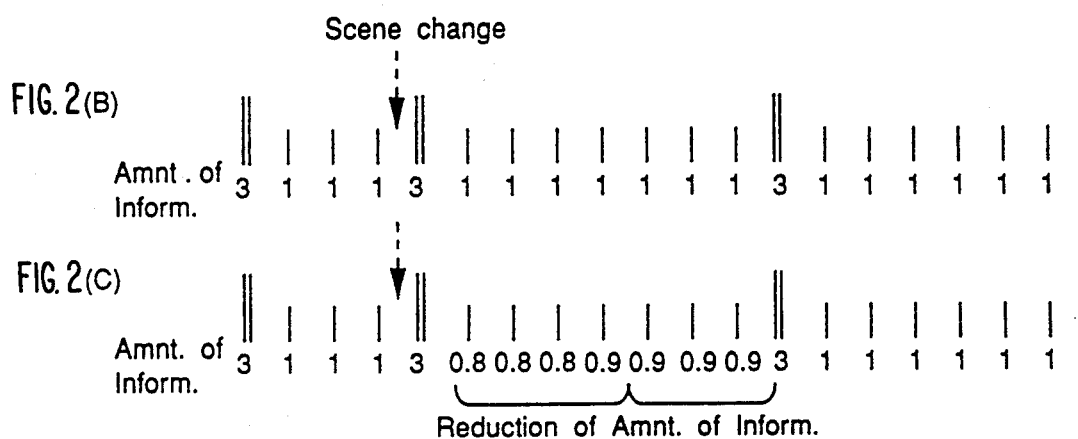
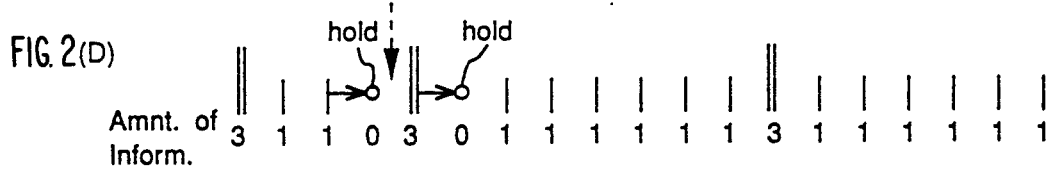
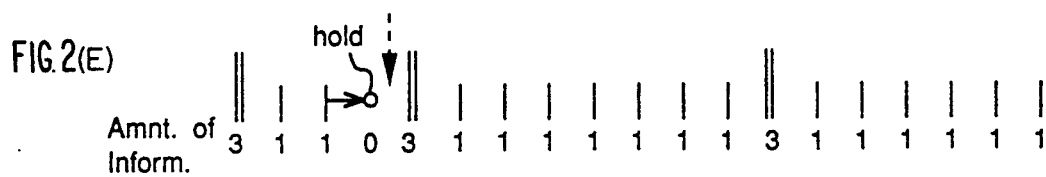

IMAGE SIGNAL RECORDING AND REPRODUCING SYSTEM WITH USE OF BANDWIDTH COMPRESSION CODING

BACKGROUND OF THE INVENTION

1. Field of the Invention

The present invention relates to a signal processing method for bandwidth compression coding of an image signal, and to a recording and reproducing device for recording this information to a recording medium such as an optical disk or a video tape and reproducing the information from this medium.

2. Prior art

Known image signal compression coding methods include in-field, in-frame, inter-field, and inter-frame. Inter-field and inter-frame coding use the correlation between the current field or frame and the fields or frames chronologically before and after the current field or frame to achieve a generally high compression ratio compared with in-field or in-frame compression coding, but requires in-frame or in-field coding to refresh the signal at a regular period because errors, when they occur, are propagated along the time axis.

During scene changes, however, when there is a significant change in the image, there is no time axis correlation between the adjacent fields or frames. Inter-field or inter-frame coding is therefore meaningless, and can actually result in image deterioration under certain circumstances.

Furthermore, the total amount of compression coded information increases and the effective compression ratio therefore decreases when in-field or in-frame coding is extensively used.

SUMMARY OF THE INVENTION

The present invention is a signal processing method and recording and reproducing means which digitize an image signal and code the digitized signal by singular or plural in-field, in-frame, inter-field, and inter-frame means. The inter-field or inter-frame coding means is the primary coding device. In-field or in-frame coding is applied at a regular interval to the inter-field or inter-frame coded signal sequence, scene changes are detected and in-field or in-frame coding is mandatorily applied to the field or frame immediately following the scene change, and this field or frame becomes the starting field or frame for the in-field or in-frame coding applied at a regular interval thereafter. The increased data quantity resulting from in-field or frame compression coding is thus compensated for by increasing the compression ratio of the inter-field or inter-frame compression coding means during the regular interval between in-field or frame coding.

The invention is further comprised to absorb the increase in information generated by the field or frame immediately after the scene change by mandatorily coding the field or frame immediately after a scene change by the in-field or in-frame coding means using the same data as that of the immediately preceding field or frame for the field or frame immediately before or after the scene change.

Thus, the field or frame immediately after the scene change is efficiently coded, and the total amount of information produced is not increased.

BRIEF DESCRIPTION OF THE DRAWINGS

The present invention will become more fully understood from the detailed description given below and the accompanying diagrams wherein:

FIG.2E are illustrations of the basic compression coding pattern according to the preferred embodiment.

DESCRIPTION OF PREFERRED EMBODIMENTS

Figure 1:
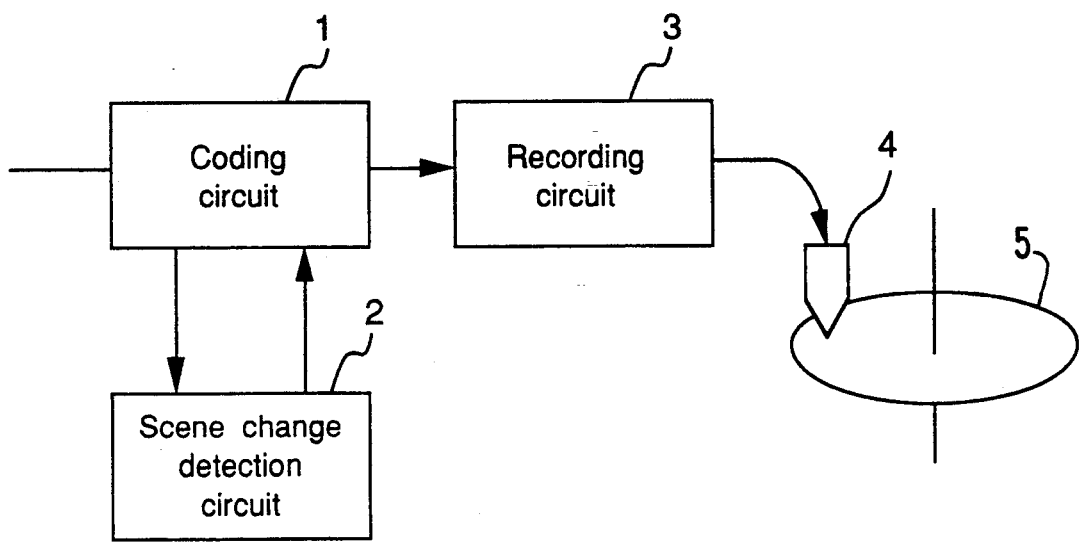
FIG. 1 is a block diagram of the preferred embodiment of the present invention.

FIG. 1 is a block diagram of the preferred embodiment of the present invention comprising a coding circuit 1, scene change detection circuit 2, recording circuit 3, and recording/reproducing head 4.

Figure 3:
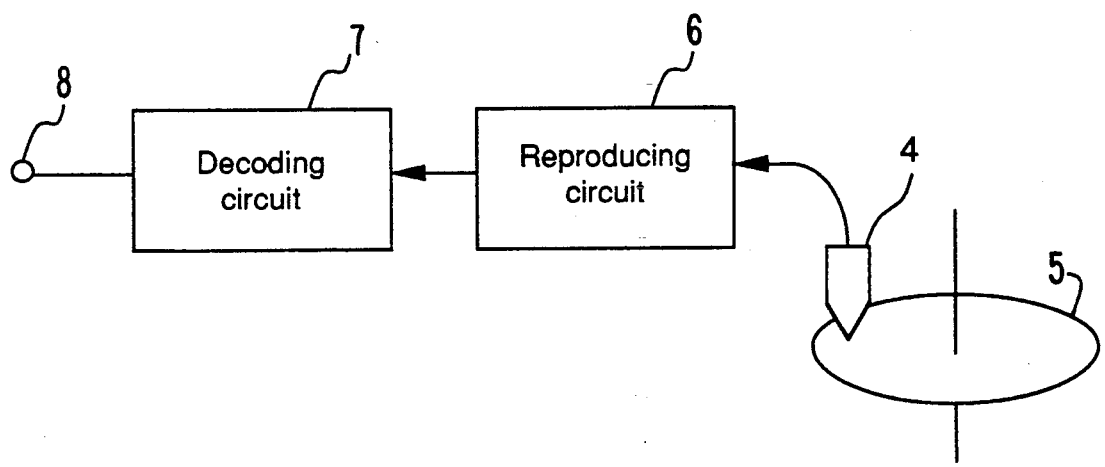
FIG. 3 is a block diagram of the reproduction processing system for reproducing the image signal.

The coding circuit 1 digitizes the image signal and compression codes the signal by means of in-field, in-frame, inter-field, and inter-frame coding used singularly or in combination. The scene change detection circuit 2 detects scene changes. The recording circuit 3 converts the output of the coding circuit 1 to a recording signal. The recording/reproducing head 4 records the output of the recording circuit 3 to the recording medium 5, or as shown in FIG. 3, reproduces the recorded information from the recording medium 5.

In the operation of this device the image signal is primarily compressed by inter-field or inter-frame coding with in-field or in-frame coding applied at a regular interval. Scene changes are detected, and in-field or in-frame coding is mandatorily applied to the field or frame immediately after the scene change. The information is then recorded to the recording medium, or is reproduced therefrom.

The basic compression coding pattern is shown in FIG. 2 (A). In-frame coding is applied at a regular cycle of eight frames. Inter-frame coding is applied to the frames between the in-frame coded frames.

It is common in inter-frame processing to forward the difference between the current and previous frame, but other methods can also be used, including coding the current frame based on the correlation with the previous and following frames. The following description assumes inter-frame processing based on the difference with the preceding frame.

It is first assumed that there is a scene change between the fourth and fifth frames. In this case there is no correlation between the fourth and fifth frames. As such, it would be difficult to obtain a satisfactory compression ratio with inter-frame coding. In the worst case inter-frame coding will actually result in more information than would in-frame coding, and is therefore undesirable.

Therefore, as shown in FIG. 2 (B), in-frame coding is applied to the frame immediately after the scene change, and this frame is also used as the first frame in a new in-frame coding cycle. This successfully prevents image deterioration, but increases the amount of information.

If the ratio between the amount of information in the in-frame and inter-frame coded frames is 3:1, the amount of information resulting from coding frames 1 to 16 inclusive by the method shown in FIG. 2 (A) will be $$(3\times2+1\times14)\times K=20K$$

where K is a constant, and by the method shown in FIG. 2(B) will be $$(3\times3+1\times13)\times K=22K.$$

There is thus a 2K increase in the amount of information where K is a constant value expressing data quantity.

This increase is undesirable in a system which transfers or records and reproduces a constant amount of information in a constant period.

It is therefore necessary to reduce the amount of information. A first method to accomplish this is illustrated in FIG. 2 (C). In this method, the amount of information is reduced by reducing the compression ratio to 0.8 to 0.9 from the conventional value of 1 in the inter-frame coded frames 6-12 between the frame 5 mandatorily compressed by in-frame coding due to the scene change immediately therebefore, and frame 13 at the end of the new cycle starting at frame 5. This conforms with the tendency of errors in the frame immediately after a scene change to be difficult to distinguish visually. It is therefore possible to reduce the total data quantity by an amount approximately equal to K.

In a second method additional information is not generated by using as the data for the frame immediately preceding the frame immediately before the scene change the data from the frame two frames before the scene change, or using as the data for the frame two frames after the scene change the data from the frame immediately after the scene change, or by using both of these data substitutions.

Specifically, referring to FIG. 2 (D), frame 4 is identical to frame 3, i.e., the data from the immediately preceding frame is held, and frame 6 is identical to frame 5. This is possible because there is no continuity of motion at the precise moment of the scene change, and there will therefore be no visibly noticeable deterioration of the image when the same data is used for adjacent frames. That case in which the previous frame data is held for the frames before and after the scene change is shown in FIG. 2 (D), and that case in which the data is held for only the preceding frame is shown in FIG. 2 (E). Approximately 2K of data is saved in the former (FIG. 2 (D)) case, and approximately 1K is saved in the latter (FIG. 2 (E)) case.

It is to be noted that it is also possible to only hold the data for the frame immediately after the scene change.

Note also that it would be meaningless to use inter-frame compression coding for the frame immediately before the scene change using data from the following frame because there is no continuity between the two frames. In other words, it is preferable to compression code the frame immediately before a scene change by in-frame compression coding or inter-frame compression coding using only information from the previous frame.

Furthermore, it should be noted that while the invention was described above with specific reference to in-frame and inter-frame processing, the invention shall not be thus limited and the same effect is obtained by in-field and inter-field processing. Furthermore, inter-frame or inter-field processing can also be applied with data interpolated from the fields or frames before and after the current compression field or frame.

In addition, the present embodiment was described as absorbing the increase in data generated immediately by a scene change within the seven frames after the scene change, or by holding the frame data immediately before and/or after a scene change to compensate for the increased data quantity. It is also possible, however, to reduce the amount of information within a given number of frames or period (e.g., one second). This will be in relation to the buffer capacity during coding and decoding.

Moreover, it is necessary to distinguish those frames in which in-frame compression coding was applied at a regular interval and was applied mandatorily due to a scene change. The decoding operation can be greatly simplified in this case by outputting or recording the data with an added bit set HIGH or LOW at a predetermined position in the frame immediately after the scene change.

It is to be noted that when the information resulting from the above process is to be recorded and reproduced by means of an optical disk, video tape, or other packaged medium, the recording circuit 3 and recording/reproducing head 4 shown in FIG. 1 and FIG. 3 are required, but these are not required if the data is simply to be transmitted to another processing device.

Further, FIG. 3 shows a block diagram of the reproduction processing system. Data reproduced by the optical head 4 is converted into reproduction digital image data by the reproducing circuit 6 and the latter is decoded into the image signal by the decoding circuit 7 to output the same from the terminal 8. As stated above, very efficient coding is obtained by processing data before and after a scene change. Upon reproducing the image signal, the conventional reproduction processing system is available in the present system without any changes.

It is thus possible to provide a signal processing method and a recording and reproducing device implementing this method of achieving high image quality, low bit rate image data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A signal processing system comprising:
   (1) a coding means for digitizing an image signal and coding the digitized image signal in units of a predetermined data length, said coding means comprising an intra-unit coding means for coding the digitized image signal in said units of said predetermined data length and an inter-unit coding means for coding the digitized image signal over two successive units; and
   (2) a scene change detection means for detecting scene changes,
      wherein said coding means performs coding for the digitized image signal by said intra-unit coding means at a cycle having a length equal to a predetermined number of said units of said predetermined data length, while coding a remaining digitized image signal by said inter-unit coding means, and also mandatorily performs coding, by said intra-unit coding means, for a unit immediately after a scene change, when said scene change is detected by said scene change detection means, and wherein a compression ratio of said inter-unit coding means is increased during one cycle of said intra-unit coding means corresponding to the detected scene change, thereby absorbing an increase of information due to the mandatory coding by said intra-unit coding means.

2. The signal processing system according to claim 1 wherein a new cycle of said intra-unit coding means is started from a unit immediately after the scene change is detected.

3. The signal processing system according to claim 1 wherein an indication code is added to the unit immediately after the scene change to discriminate it from other units coded during said cycle.

4. The signal processing system according to claim 2 wherein an indication code is added to the unit immediately after the scene change to discriminate it from other units coded during said cycle.

5. A signal processing system comprising:
(1) a coding means for digitizing an image signal and coding the digitized image signal in units of a predetermined data length, said coding means comprising an intra-unit coding means for coding the digitized image signal in said units of said predetermined data length and an inter-unit coding means for coding the digitized image signal over two successive units; and
(2) a scene change detection means for detecting scene changes,
wherein said coding means performs coding for the digitized image signal by said intra-unit coding means at a cycle having a length equal to a predetermined number of said units of said predetermined data length, while coding a remaining digitized image signal by said inter-unit coding means, and also mandatorily performs coding, by said intra-unit coding means, for a unit immediately after a scene change, when said scene change is detected by said scene change detection means, and
wherein coding for at least one unit related to the unit immediately after the scene change is performed using data of a unit immediately preceding said at least one unit, thereby suppressing an increase of information due to the mandatory coding by said intra-unit coding means.

* * * * *